United States Patent
Zhang

(10) Patent No.: US 8,902,795 B2
(45) Date of Patent: Dec. 2, 2014

(54) SYSTEM AND METHOD FOR IMPROVING SERVICE SUBSCRIPTION OR UNSUBSCRIPTION SPEED FOR WIRELESS APPLICATION PROTOCOL (WAP) ROAMING USERS

(75) Inventor: Jiwei Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 145 days.

(21) Appl. No.: 13/522,558

(22) PCT Filed: Sep. 25, 2010

(86) PCT No.: PCT/CN2010/077284
§ 371 (c)(1),
(2), (4) Date: Jul. 17, 2012

(87) PCT Pub. No.: WO2011/120287
PCT Pub. Date: Oct. 6, 2011

(65) Prior Publication Data
US 2013/0010650 A1    Jan. 10, 2013

(30) Foreign Application Priority Data
Mar. 31, 2010    (CN) .......................... 2010 1 0136797

(51) Int. Cl.
*H04L 12/16* (2006.01)
*H04W 60/00* (2009.01)
(Continued)

(52) U.S. Cl.
CPC ............... *H04W 60/00* (2013.01); *H04L 69/16* (2013.01); *H04L 67/04* (2013.01);
(Continued)

(58) Field of Classification Search
None
See application file for complete search history.

(56) References Cited

U.S. PATENT DOCUMENTS

| 7,305,230 | B2 * | 12/2007 | Zhigang ..................... 455/414.1 |
| 7,797,529 | B2 * | 9/2010 | Jiang et al. .................... 713/151 |

(Continued)

FOREIGN PATENT DOCUMENTS

| CN | 1633201 A | 6/2005 |
| CN | 101378551 A | 3/2009 |
| CN | 101808138 A | 8/2010 |

OTHER PUBLICATIONS

International Search Report; Jan. 6, 2011; issued in International Patent Application No. PCT/CN2010/077284.

*Primary Examiner* — Brian Roberts
(74) *Attorney, Agent, or Firm* — Moore & Van Allen PLLC; Henry B. Ward, III

(57) ABSTRACT

The present invention discloses a system and a method for improving service subscription or unsubscription speed for Wireless Application Protocol (WAP) roaming users, wherein the system comprises a national WAP portal protocol conversion module and provincial WAP portal protocol conversion modules. The national WAP portal protocol conversion module and each provincial WAP portal protocol conversion module are configured to, through performing conversion between a synchronous message and an asynchronous message, inform a corresponding provincial WAP portal of a subscription or unsubscription request sent by a national WAP portal through a long connection link between the national WAP portal protocol conversion module and the provincial WAP portal protocol conversion module, and inform the national WAP portal of a processing result of subscription or unsubscription performed by the provincial WAP portal through the long connection link. The present invention accomplishes the conversion transmission of the synchronous message and asynchronous message through protocol conversion modules, reduces the load of the national WAP portal greatly, and makes it quite obvious that the service subscription or unsubscription speed for users is improved.

15 Claims, 2 Drawing Sheets

(51) Int. Cl.
  *H04L 29/08* (2006.01)
  *H04L 29/06* (2006.01)
  *H04W 80/12* (2009.01)
(52) U.S. Cl.
  CPC .............. *H04W 80/12* (2013.01); *H04L 69/08* (2013.01); *H04L 67/2885* (2013.01)
  USPC .......................... 370/259; 370/401; 455/435.1

(56) References Cited

U.S. PATENT DOCUMENTS

| | | | |
|---|---|---|---|
| 2002/0068609 A1* | 6/2002 | Oh et al. | 455/560 |
| 2002/0105934 A1* | 8/2002 | Lee et al. | 370/338 |
| 2002/0138565 A1* | 9/2002 | Kustov et al. | 709/203 |
| 2003/0035409 A1* | 2/2003 | Wang et al. | 370/349 |
| 2005/0044197 A1* | 2/2005 | Lai | 709/223 |

* cited by examiner

SYSTEM AND METHOD FOR IMPROVING SERVICE SUBSCRIPTION OR UNSUBSCRIPTION SPEED FOR WIRELESS APPLICATION PROTOCOL (WAP) ROAMING USERS

FIELD OF THE INVENTION

The present invention relates to the technical field of communications, in particular to a system and a method for improving service subscription or unsubscription speed for Wireless Application Protocol (WAP) roaming users.

BACKGROUND OF THE INVENTION

When WAP roaming users subscribe for provincial services in service products, a request is required to be forwarded through a national WAP portal. After receiving a request sent from a user terminal, the national WAP portal forwards a subscription or unsubscription message to a provincial WAP portal corresponding to the user according to a home location of a user number. After accomplishing the service subscription or unsubscription of the user, the provincial WAP portal returns a processing result to the user.

A WebService message is adopted for transmission between the national WAP portal and the provincial WAP portal. As the WebService message is a synchronous message and is transmitted through a short connection link, the efficiency of link establishment and transmission is relatively low. When traffic for access of the national WAP users is large, the service subscription and unsubscription speed for the users is slow. As a result, in the implementation of the existing system, the processing speed for forwarding the messages of the national WAP portal has become a bottleneck of the whole system.

SUMMARY OF THE INVENTION

In consideration of the analysis above, the present invention provides a system and a method for improving service subscription or unsubscription speed for WAP roaming users, which solves the problem in the related art that the service subscription or unsubscription speed for the users is relatively low when the traffic for access of the national WAP users is large.

The present invention mainly comprises the following technical solutions.

The present invention provides a system for improving service subscription or unsubscription speed for WAP roaming users, the system comprises: a national WAP portal protocol conversion module and provincial WAP portal protocol conversion modules, wherein a long connection link is established and maintained between the national WAP portal protocol conversion module and each provincial WAP portal protocol conversion module;

the national WAP portal protocol conversion module and each provincial WAP portal protocol conversion module are configured to, through performing conversion between a synchronous message and an asynchronous message, inform a corresponding provincial WAP portal of a subscription or unsubscription request sent by a national WAP portal through the long connection link, and inform the national WAP portal of a processing result of subscription or unsubscription performed by the provincial WAP portal through the long connection link.

Preferably, the national WAP portal protocol conversion module is configured to: convert a synchronous message, which requests for subscription or unsubscription, forwarded by the national WAP portal into a corresponding asynchronous message, which requests for subscription or unsubscription, according to a preset conversion rule, and send the asynchronous message, which requests for subscription or unsubscription, to the corresponding provincial WAP portal protocol conversion module through the long connection link; convert an asynchronous message of the processing result returned by the provincial WAP portal protocol conversion module into a corresponding synchronous message of the processing result according to a preset conversion rule, and return the synchronous message of the processing result to the national WAP portal.

Preferably, the national WAP portal protocol conversion module comprises:

a first cache unit, configured to receive and cache the synchronous message, which requests for subscription or unsubscription, forwarded by the national WAP portal; and a first conversion unit, configured to convert the synchronous message, which requests for subscription or unsubscription, forwarded by the national WAP portal into the corresponding asynchronous message, which requests for subscription or unsubscription, according to the preset conversion rule, and send the asynchronous message, which requests for subscription or unsubscription, to the corresponding provincial WAP portal protocol conversion module through the long connection link; match with the corresponding synchronous message, which requests for subscription or unsubscription, in the first conversion unit according to the asynchronous message of the processing result sent from the provincial WAP portal protocol conversion module, convert the asynchronous message of the processing result returned by the provincial WAP portal protocol conversion module into the corresponding synchronous message of the processing result according to the preset conversion rule, and return the synchronous message of the processing result to the national WAP portal.

Preferably, the provincial WAP portal protocol conversion module is configured to convert the asynchronous message, which requests for subscription or unsubscription, sent from the national WAP portal protocol conversion module into a corresponding synchronous message, which requests for subscription or unsubscription, according to a preset conversion rule, and send the synchronous message, which requests for subscription or unsubscription, to the provincial WAP portal; convert a synchronous message of the processing result sent from the provincial WAP portal into the corresponding asynchronous message of the processing result according to a preset conversion rule, and return the asynchronous message of the processing result to the national WAP portal protocol conversion module.

Preferably, the provincial WAP portal protocol conversion module comprises:

a second cache unit, configured to receive and cache the asynchronous message, which requests for subscription or unsubscription, sent from the national WAP portal protocol conversion module; and a second conversion unit, configured to convert the asynchronous message, which requests for subscription or unsubscription, sent from the national WAP portal protocol conversion module into the corresponding synchronous message, which requests for subscription or unsubscription, according to the preset conversion rule, and send the synchronous message, which requests for subscription or unsubscription, to the provincial WAP portal; and match with the corresponding asynchronous message, which requests for subscription or unsubscription, in the second cache module according to the synchronous message of the processing result sent from the provincial WAP portal, convert the synchronous message of the processing result sent from the provincial WAP portal into the corresponding asynchronous message of the processing result according to the preset conversion rule, and return the asynchronous message of the processing result to the national WAP portal protocol conversion module.

Preferably, the asynchronous message is a WebService message, and the synchronous message is a Transmission Control Protocol (TCP) message.

The present invention also provides a method for improving service subscription or unsubscription speed for WAP roaming users, the method comprises:

Step A, establishing and maintaining a long connection link between a national WAP portal protocol conversion module and each provincial WAP portal protocol conversion module;

Step B, the national WAP portal protocol conversion module and the provincial WAP portal protocol conversion module informing a corresponding provincial WAP portal of a subscription or unsubscription request sent from a national WAP portal through performing conversion between a synchronous message and an asynchronous message; and Step C, the provincial WAP portal, which obtains the subscription or unsubscription request of a user, performing subscription or unsubscription process; the provincial WAP portal protocol conversion module and the national WAP portal protocol conversion module informing the national WAP portal of a processing result through performing conversion between a synchronous message and an asynchronous message.

Preferably, the Step B comprises:

Step B1, after converting a synchronous message, which requests for subscription or unsubscription, sent from the national WAP portal into a corresponding asynchronous message, which requests for subscription or unsubscription, according to a preset conversion rule, the national WAP portal protocol conversion module sending the asynchronous message, which requests for subscription or unsubscription, to the corresponding provincial WAP portal protocol conversion module through the long connection link; and Step B2, after converting the asynchronous message, which requests for subscription or unsubscription, sent from the national WAP portal protocol conversion module into a corresponding synchronous message, which requests for subscription or unsubscription, according to a preset conversion rule, the provincial WAP portal protocol conversion module sending the synchronous message, which requests for subscription or unsubscription, to the provincial WAP portal.

Preferably, the Step C comprises:

Step C1, the provincial WAP portal, which obtains the subscription or unsubscription request message of the user, performing the subscription or unsubscription process and sending a synchronous message of the processing result;

Step C2, after converting the synchronous message of the processing result sent from the provincial WAP portal into a corresponding asynchronous message of the processing result according to a preset conversion rule, the provincial WAP portal protocol conversion module sending the asynchronous message of the processing result to the national WAP portal protocol conversion module; and Step C3, after converting the asynchronous message of the processing result returned by the provincial WAP portal protocol conversion module into a corresponding synchronous message of the processing result according to a preset conversion rule, the national WAP portal protocol conversion module returning the synchronous message of the processing result to the national WAP portal.

Preferably, the Step C2 comprises:

the provincial WAP portal protocol conversion module matching with the corresponding asynchronous message, which requests for subscription or unsubscription, according to the synchronous message of the processing result sent from the provincial WAP portal, after converting the synchronous message of the processing result sent from the provincial WAP portal into the corresponding asynchronous message of the processing result, returning the asynchronous message of the processing result to the national WAP portal protocol conversion module.

Preferably, the Step C3 comprises:

the national WAP portal protocol conversion module matching with the corresponding synchronous message, which requests for subscription or unsubscription, according to the asynchronous message of the processing result sent from the provincial WAP portal conversion module; after converting the asynchronous message of the processing result returned by the provincial WAP portal protocol conversion module into the corresponding synchronous message of the processing result according to the preset conversion rule, returning the synchronous message of the processing result to the national WAP portal.

The present invention has beneficial effects as follows:

the present invention accomplishes the conversion transmission of the synchronous message and asynchronous message through the protocol conversion modules, reduces the load of the national WAP portal greatly, and makes it quite obvious that the service subscription or unsubscription speed for users is improved.

Other features and advantages of the present invention will be described in the following description and partly become obvious from the description, or be understood by implementing the present invention. The objects and other advantages of the present invention can be realized and obtained through the structures indicated by the description, claims and drawings.

DETAILED DESCRIPTION OF THE EMBODIMENTS

The preferable embodiments of the present invention are described in detail with reference to accompanying drawings, wherein the accompanying drawings constitute a portion of the application and is used to illustrate the principle of the present invention together with the embodiments of the present invention. In order to clarify and simplify the embodiments, when the theme of the present invention may be incurred to be indefinable, omit the detailed and specific illustration of the known functions and structures in the devices described in the specification.

Firstly, the system in accordance with an embodiment of the present invention is illustrated in detail with reference to the FIG. 1.

Figure 1:
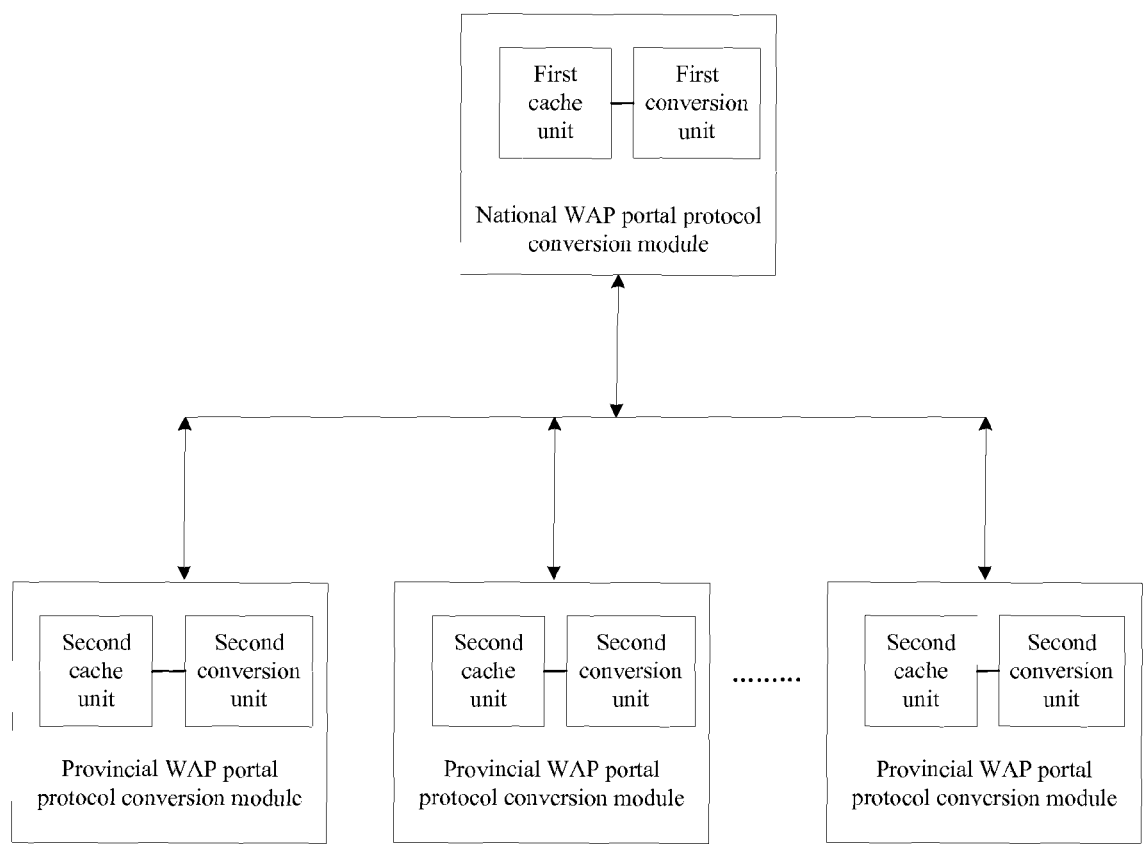
FIG. 1 shows a structural schematic diagram of a system in an embodiment of the present invention.

FIG. 1 shows the structural schematic diagram of the system in an embodiment of the present invention. As shown in the FIG. 1, the system can comprise: a national WAP portal protocol conversion module and a plurality of provincial WAP portal protocol conversion modules. A TCP long connection link is established and maintained between the national WAP portal protocol conversion module and each provincial WAP portal protocol conversion module; the specific configuration process is set according to parameters required by the national WAP portal and each provincial WAP portal and refers to the configuration embodiment. The national WAP portal protocol conversion module and the provincial WAP portal protocol conversion module accomplish the conversion transmission of the synchronous message and asynchronous message together, inform the corresponding provincial WAP portal of a subscription or unsubscription request sent by the national WAP portal through the long connection link and inform the national WAP portal of the processing result of subscription or unsubscription performed by the provincial WAP portal through the long connection link.

The national WAP portal protocol conversion module specifically comprises a first cache unit and a first conversion unit; and the provincial WAP portal protocol conversion module specifically comprises a second cache unit and a second conversion unit. Specifically, after receiving a WebService message, which requests for subscription or unsubscription, sent from a user terminal, the national WAP portal judges the province to which the user belongs according to the user number, and then transmits the WebService message, which requests for subscription or unsubscription, and a provincial code to the national WAP portal protocol conversion module. The first cache unit in the national WAP portal protocol conversion module receives the WebService message which requests for subscription or unsubscription and caches the WebService message which requests for subscription or unsubscription in a WebService message queue therein; after converting the WebService message which requests for subscription or unsubscription into a corresponding TCP message which requests for subscription or unsubscription according a preset conversion rule, the first conversion unit sends the TCP message which requests for subscription or unsubscription to the provincial WAP portal protocol conversion module in a corresponding provincial WAP portal through the TCP long connection link. The second cache unit in the provincial WAP portal protocol conversion module receives the TCP message, which requests for subscription or unsubscription, sent from the national WAP portal protocol conversion module and caches the received TCP message which requests for subscription or unsubscription in a TCP message queue therein; after converting the TCP message which requests for subscription or unsubscription into a corresponding WebService message which requests for subscription or unsubscription according to a preset conversion rule, the second conversion unit sends the TCP message which requests for subscription or unsubscription to a provincial WAP portal. The provincial WAP portal accomplishes the process of subscription or unsubscription of the user.

When the provincial WAP portal accomplishes the subscription or unsubscription process and returns a WebService message of a processing result to the provincial WAP portal protocol conversion module, the second conversion unit receives the WebService message of the processing result returned by the provincial WAP portal, matches with a corresponding TCP message which requests for subscription or unsubscription in the WebService message queue of the second cache unit according to the received WebService message of the processing result, converts the WebService message of the processing result into the corresponding TCP message of the processing result according to the preset conversion rule and then returns the TCP message of the processing result to the national WAP portal protocol conversion module. The first conversion unit in the national WAP portal protocol conversion module matches with a corresponding WebService message which requests for subscription or unsubscription in the TCP message queue of the first cache unit according to the TCP message of the processing result returned by the provincial WAP portal protocol conversion module, converts the TCP message of the processing result into the corresponding WebService message of the processing result according to the preset conversion rule and then returns the WebService message of the processing result to the national WAP portal. The national WAP portal finally returns the processing result of the subscription or unsubscription to the user terminal.

Secondly, the method of the embodiment of the present invention is illustrated in detail with reference to the FIG. 2.

Figure 2:
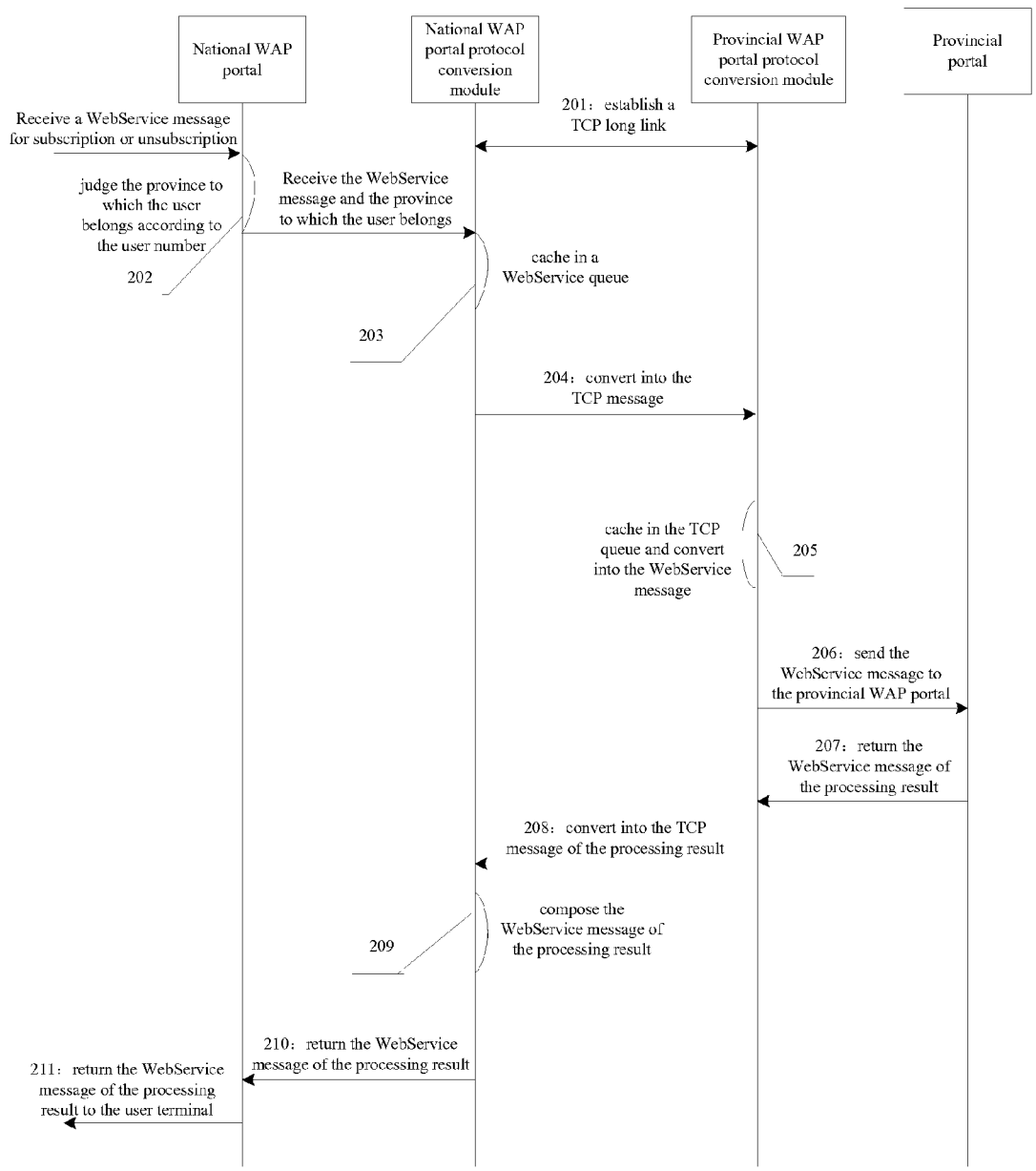
FIG. 2 shows a flowchart of a method in an embodiment of the present invention.

The FIG. 2 shows the flowchart of the method in the embodiment of the present invention. As shown in the FIG. 2, the method of the embodiment of the present invention, which utilizes the system for improving service subscription or unsubscription speed for WAP roaming users, can specifically comprise the steps as follows.

Step 201, programs of protocol conversion modules are started, a TCP long connection link is established between the national WAP portal protocol conversion module and each provincial WAP portal protocol conversion module, and each protocol conversion module manages the link and caches a message queue.

Step 202, after receiving the WebService message, which requests for subscription or unsubscription, initiated by a user, the national WAP portal judges the province to which the user belongs according to the user number, and then sends the WebService message which requests for subscription or unsubscription and the province to which the user belongs to the national WAP portal protocol conversion module in the national WAP portal.

Step 203, the national WAP portal protocol conversion module caches the WebService message which requests for subscription or unsubscription in the WebService message queue for the matching of the returned message, and manages the WebService message queue, wherein the specific management process can adopt existing matured technical solution of the queue management, thus, it is unnecessary to give more details.

Step 204, the national WAP portal protocol conversion module converts and packages the received WebService message which requests for subscription or unsubscription into the corresponding TCP message which requests for subscription or unsubscription according to the preset conversion rule, and then sends the TCP message which requests for subscription or unsubscription to the provincial WAP portal protocol conversion module in the provincial WAP portal corresponding to the province to which the user belongs.

Step 205, the provincial WAP portal protocol conversion module receives the TCP message, which requests for subscription or unsubscription, sent from the national WAP portal protocol conversion module, and then stores the TCP message which requests for subscription or unsubscription in the TCP message queue and manages the queue.

Step 206, the provincial WAP portal protocol conversion module converts and packages the TCP message which requests for subscription or unsubscription into the corresponding WebService message which requests for subscription or unsubscription according to the preset conversion rule and sends the WebService message which requests for subscription or unsubscription to the provincial WAP portal.

Step 207, the provincial WAP portal performs relevant process of the subscription or unsubscription of the user according to the received WebService message which requests for subscription or unsubscription, and then returns the processing result of the subscription or unsubscription to the provincial WAP portal protocol conversion module via a WebService message.

Step 208, the provincial WAP portal protocol conversion module matches with a TCP message corresponding to the WebService message of the processing result in the TCP message queue according to the WebService message of the processing result received from the provincial portal, converts and packages the WebService message of the processing result into the TCP message of the processing result according to the preset conversion rule and returns the TCP message of the processing result to the national WAP portal protocol conversion module.

Step 209, the national WAP portal protocol conversion module matches with a WebService message corresponding to the TCP message of the processing result in the WebService message queue according to the TCP message of the processing result returned by the provincial WAP portal protocol conversion module, and converts and packages the TCP message of the processing result into the WebService message of the processing result according to the preset conversion rule.

Step 210, the national WAP portal protocol conversion module returns the WebService message of the processing result to the national WAP portal.

Step 211, the national WAP portal returns the WebService message of the processing result to the user terminal so that the user terminal can obtain the current processing result of subscription or unsubscription through the WebService message of the processing result.

In the embodiment of the present invention, the preset conversion rule is a message format conversion rule which is defined according to the structural mapping relationship between the TCP message and the WebService message. When converting the WebService message into the TCP message, generally, it is necessary to remove a plurality of fields in the WebService message and package according to the format of the TCP message. When converting the TCP message into the WebService message, generally, it is necessary to add a plurality of fields in the WebService message and package according to the format of the WebService message. The specific conversion rule can be defined by those skilled in the art according to practical requirements and the formats of the two messages, thus it is unnecessary to describe in detail.

In addition, excerpt of basic content of the configuration items of the national WAP portal protocol conversion module and the provincial WAP portal conversion module is shown as follows:

```
[general]
    ;Tcp link connection count, when the Tcp link connection count is zero, it indicates
that the protocol conversion module is not used
        TcpConnectCount=1
    ;If TcpConnectCount is greater than 1, content of each TcpConnect needs to be
sequentially configured
    [TcpConnect1]
        ;TCP link type, when the TCP link type is 0, it indicates that the link is at the Server
end, and if the TCP link type is 1, it indicates that the link is at the Client end
        TcpType=1
        ;IP address of the local computer
        MyIpaddr=10.42.73.8
        ;IP address of the opposite end
        DestIpaddr=10.42.73.15
        ;Port number, when the Port number is Server, it indicates the monitoring port
number of the local computer, and when the Port number is Client, it indicates the port
number of the connected opposite side
        Port=5050
        ;Protocol conversion type, when the protocol conversion type is 0, it indicates
conversion from Tcp message to WebService message, and when the protocol conversion type
is 1, it indicates conversion from WebService message to Tcp message
        ChangeType=1
        ;Field number, the Field number is the field number of the WebService message
when Tcp is converted into the WebService message, and the Field number is the field number
of the Tcp message when the WebService message is converted into the Tcp
        FieldNum=5
        ;Field description, the Field description is the field description of the WebService
message when Tcp is converted into the WebService message and is the field description of
the Tcp when the WebService message is converted into Tcp
        ;The configuration method is as follows: field name after the conversion,
corresponding original protocol field name, type after conversion (0--INT16,1--INT32,2--char
3--DateTime YYYYMMDDHHMISI format), and maximum length of field after conversion
(reformed into the maximum byte number)
        MsdId=MsgIndex,1,4
        Msisdn=UserNumber,2,15
        ServiceType=ServiceType,0,2
        SubTime=SubTime,3,14
        SpId=Spid,2,20
```

In conclusion, the embodiments of the present invention improve a system and a method for improving service subscription or unsubscription speed for WAP roaming users. The national WAP portal protocol conversion module and provincial WAP portal protocol conversion modules realize the long link establishment, the message transmission, the message caching and management, the message conversion and the like according to the configuration, and convert the synchronous messages of the national WAP portal and the provincial WAP portals to asynchronous messages internally and automatically. The protocol conversion modules which are simple in loading and configuration and strong in flexibility are coupled seamlessly with the original system so as to improve the message processing speed of the whole system greatly.

The above are only the preferable embodiments of the present invention and not intended to limit the scope of protection of the present invention. Any modifications or equivalent replacements easily obtained by those skilled in the art shall fall within the scope of protection of the present invention. Consequently, the scope of protection of the present invention shall be based on the scope of protection of the claims.

What is claimed is:

1. A system for improving service subscription or unsubscription speed for Wireless Application Protocol (WAP) roaming users, wherein the system comprises: a national WAP portal protocol conversion module and provincial WAP portal protocol conversion modules, wherein a connection link is established and maintained between the national WAP portal protocol conversion module and each provincial WAP portal protocol conversion module;

the national WAP portal protocol conversion module and each provincial WAP portal protocol conversion module are configured to, through performing conversion between a synchronous message and an asynchronous message, inform a corresponding provincial WAP portal of a subscription or unsubscription request sent by a national WAP portal through the connection link, and inform the national WAP portal of a processing result of subscription or unsubscription performed by the provincial WAP portal through the connection link.

2. The system according to claim 1, wherein the national WAP portal protocol conversion module is configured to: convert a synchronous message, which requests for subscription or unsubscription, forwarded by the national WAP portal into a corresponding asynchronous message, which requests for subscription or unsubscription, according to a preset conversion rule, and send the asynchronous message, which requests for subscription or unsubscription, to the corresponding provincial WAP portal protocol conversion module through the connection link; convert an asynchronous message of the processing result returned by the provincial WAP portal protocol conversion module into a corresponding synchronous message of the processing result according to a preset conversion rule, and return the synchronous message of the processing result to the national WAP portal.

3. The system according to claim 2, wherein the national WAP portal protocol conversion module comprises: a first cache unit and a first conversion unit, wherein the first cache unit is configured to receive and cache the synchronous message, which requests for subscription or unsubscription, forwarded by the national WAP portal; and the first conversion unit is configured to convert the synchronous message, which requests for subscription or unsubscription, forwarded by the national WAP portal into the corresponding asynchronous message, which requests for subscription or unsubscription, according to the preset conversion rule, and send the asynchronous message, which requests for subscription or unsubscription, to the corresponding provincial WAP portal protocol conversion module through the connection link; match with the corresponding synchronous message, which requests for subscription or unsubscription, in the first conversion unit according to the asynchronous message of the processing result sent from the provincial WAP portal protocol conversion module, convert the asynchronous message of the processing result returned by the provincial WAP portal protocol conversion module into the corresponding synchronous message of the processing result according to the preset conversion rule, and return the synchronous message of the processing result to the national WAP portal.

4. The system according to claim 3, wherein the asynchronous message is a WebService message, and the synchronous message is a Transmission Control Protocol (TCP) message.

5. The system according to claim 2, wherein the provincial WAP portal protocol conversion module is configured to convert the asynchronous message, which requests for subscription or unsubscription, sent from the national WAP portal protocol conversion module into a corresponding synchronous message, which requests for subscription or unsubscription, according to a preset conversion rule, and send the synchronous message, which requests for subscription or unsubscription, to the provincial WAP portal; convert a synchronous message of the processing result sent from the provincial WAP portal into the corresponding asynchronous message of the processing result according to a preset conversion rule, and return the asynchronous message of the processing result to the national WAP portal protocol conversion module.

6. The system according to claim 5, wherein the provincial WAP portal protocol conversion module comprises: a second cache unit and a second conversion unit, wherein the second cache unit is configured to receive and cache the asynchronous message, which requests for subscription or unsubscription, sent from the national WAP portal protocol conversion module; and the second conversion unit is configured to convert the asynchronous message, which requests for subscription or unsubscription, sent from the national WAP portal protocol conversion module into the corresponding synchronous message, which requests for subscription or unsubscription, according to the preset conversion rule, and send the synchronous message, which requests for subscription or unsubscription, to the provincial WAP portal; and match with the corresponding asynchronous message, which requests for subscription or unsubscription, in the second cache module according to the synchronous message of the processing result sent from the provincial WAP portal, convert the synchronous message of the processing result sent from the provincial WAP portal into the corresponding asynchronous message of the processing result according to the preset conversion rule, and return the asynchronous message of the processing result to the national WAP portal protocol conversion module.

7. The system according to claim 6, wherein the asynchronous message is a WebService message, and the synchronous message is a Transmission Control Protocol (TCP) message.

8. The system according to claim 5, wherein the asynchronous message is a WebService message, and the synchronous message is a Transmission Control Protocol (TCP) message.

9. The system according to claim 2, wherein the asynchronous message is a WebService message, and the synchronous message is a Transmission Control Protocol (TCP) message.

10. The system according to claim 1, wherein the asynchronous message is a WebService message, and the synchronous message is a Transmission Control Protocol (TCP) message.

11. A method for improving service subscription or unsubscription speed for WAP roaming users, wherein the method comprises:

Step A, establishing and maintaining a connection link between a national WAP portal protocol conversion module and each provincial WAP portal protocol conversion module;

Step B, the national WAP portal protocol conversion module and the provincial WAP portal protocol conversion module informing a corresponding provincial WAP portal of a subscription or unsubscription request sent from a national WAP portal through performing conversion between a synchronous message and an asynchronous message; and Step C, the provincial WAP portal, which obtains the subscription or unsubscription request of a user, performing subscription or unsubscription process; the provincial WAP portal protocol conversion module and the national WAP portal protocol conversion module informing the national WAP portal of a processing result through performing conversion between a synchronous message and an asynchronous message.

12. The method according to claim 11, wherein the Step B comprises:

Step B1, after converting a synchronous message, which requests for subscription or unsubscription, sent from the national WAP portal into a corresponding asynchronous message, which requests for subscription or unsubscription, according to a preset conversion rule, the national WAP portal protocol conversion module sending the asynchronous message, which requests for subscription or unsubscription, to the corresponding provincial WAP portal protocol conversion module through the connection link; and Step B2, after converting the asynchronous message, which requests for subscription or unsubscription, sent from the national WAP portal protocol conversion module into a corresponding synchronous message, which requests for subscription or unsubscription, according to a preset conversion rule, the provincial WAP portal protocol conversion module sending the synchronous message, which requests for subscription or unsubscription, to the provincial WAP portal.

13. The method according to claim 12, wherein the Step C comprises:

Step C1, the provincial WAP portal, which obtains the subscription or unsubscription request message of the user, performing the subscription or unsubscription process and sending a synchronous message of the processing result;

Step C2, after converting the synchronous message of the processing result sent from the provincial WAP portal into a corresponding asynchronous message of the processing result according to a preset conversion rule, the provincial WAP portal protocol conversion module sending the asynchronous message of the processing result to the national WAP portal protocol conversion module; and Step C3, after converting the asynchronous message of the processing result returned by the provincial WAP portal protocol conversion module into a corresponding synchronous message of the processing result according to a preset conversion rule, the national WAP portal protocol conversion module returning the synchronous message of the processing result to the national WAP portal.

14. The method according to claim 13, wherein the Step C2 comprises:

the provincial WAP portal protocol conversion module matching with the corresponding asynchronous message, which requests for subscription or unsubscription, according to the synchronous message of the processing result sent from the provincial WAP portal, after converting the synchronous message of the processing result sent from the provincial WAP portal into the corresponding asynchronous message of the processing result, returning the asynchronous message of the processing result to the national WAP portal protocol conversion module.

15. The method according to claim 13, wherein the Step C3 comprises:

the national WAP portal protocol conversion module matching with the corresponding synchronous message, which requests for subscription or unsubscription, according to the asynchronous message of the processing result sent from the provincial WAP portal conversion module; after converting the asynchronous message of the processing result returned by the provincial WAP portal protocol conversion module into the corresponding synchronous message of the processing result according to the preset conversion rule, returning the synchronous message of the processing result to the national WAP portal.

\* \* \* \* \*